United States Patent
Fochtman et al.

[11] Patent Number: 6,089,467
[45] Date of Patent: Jul. 18, 2000

[54] COMPRESSED NATURAL GAS INJECTOR WITH GASEOUS DAMPING FOR ARMATURE NEEDLE ASSEMBLY DURING OPENING

[75] Inventors: James Paul Fochtman, Williamsburg; Danny Orlen Wright, Cobb's Creek; James H. Cohen, Virginia Beach, all of Va.

[73] Assignee: Siemens Automotive Corporation, Auburn Hills, Mich.

[21] Appl. No.: 09/320,177

[22] Filed: May 26, 1999

[51] Int. Cl.⁷ ........................................ F02D 1/06
[52] U.S. Cl. ................... 239/5; 239/585.4; 251/129.21; 251/129.15
[58] Field of Search .............. 239/585.1–585.5, 239/533.2–533.12; 251/129.21, 129.18, 129.15

[56] References Cited

U.S. PATENT DOCUMENTS

| | | | |
|---|---|---|---|
| 2,291,968 | 8/1942 | Keefe . | |
| 3,662,987 | 5/1972 | Schlagmuller et al. | 251/139 |
| 4,662,567 | 5/1987 | Knapp | 239/585 |
| 4,783,009 | 11/1988 | Coates | 239/580 |
| 4,909,447 | 3/1990 | Gallup et al. | 239/585 |
| 4,946,107 | 8/1990 | Hunt | 239/585 |
| 4,978,074 | 12/1990 | Weinand | 239/585 |
| 4,988,967 | 1/1991 | Miller et al. | 335/279 |
| 5,035,360 | 7/1991 | Green et al. | 239/585 |
| 5,127,585 | 7/1992 | Mesenich | 239/585.5 |
| 5,341,994 | 8/1994 | Wakeman | 239/585.5 |
| 5,381,966 | 1/1995 | Gernert, II | 239/585.3 |
| 5,494,223 | 2/1996 | Hall et al. | 239/585.5 |
| 5,494,224 | 2/1996 | Hall et al. | 239/585.5 |
| 5,566,920 | 10/1996 | Romann et al. | 239/585.4 |
| 5,609,304 | 3/1997 | Sasao | 239/585.4 |
| 5,613,640 | 3/1997 | Furuya et al. | 239/585.5 |
| 5,632,467 | 5/1997 | Just et al. | 239/585.4 |
| 5,678,767 | 10/1997 | Rahbar | 239/585.1 |
| 5,704,553 | 1/1998 | Wieczorek et al. | 239/585.1 |
| 5,785,251 | 2/1996 | Wood et al. | 239/585.4 |
| 5,794,860 | 8/1998 | Neumann | 239/585.3 |

*Primary Examiner*—Andres Kashnikow
*Assistant Examiner*—Dinh Q Nguyen

[57] ABSTRACT

An electromagnetically operable fuel injector, for a gaseous fuel injection system of an internal combustion engine is disclosed, the injector having a generally longitudinal axis, a ferromagnetic core, a magnetic coil at least partially surrounding the ferromagnetic core, and an armature magnetically coupled to the magnetic coil and being movably responsive to the magnetic coil. The armature actuates a valve closing element which interacts with a fixed valve seat of a fuel valve and is movable away from the fixed valve seat when the magnetic coil is excited, the armature having a generally elongated shape and a generally central opening for axial reception and passage of gaseous fuel from a fuel inlet connector positioned adjacent thereto. The fuel inlet connector and the armature are adapted to permit a first flow path of gaseous fuel through a working gap between the fuel inlet connector and the armature and between the armature and the magnetic coil as part of a path leading to the fuel valve. The combined flow area across the working gap between the armature and the magnetic coil and valve body shell exceeds the area available for fuel flow through the armature. A method of directing gaseous fuel through the fuel injector is also disclosed.

21 Claims, 5 Drawing Sheets

COMPRESSED NATURAL GAS INJECTOR WITH GASEOUS DAMPING FOR ARMATURE NEEDLE ASSEMBLY DURING OPENING

BACKGROUND OF THE INVENTION

1. Field of the Invention

The present application relates to a Gaseous Damping System and method of controlling gaseous fuel flows for a compressed natural gas injector during opening of the injector.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through fuel injectors, hereinafter referred to as "CNG injectors", or simply "injectors". The CNG injector is required to deliver a precise amount of fuel per injection pulse and maintain this accuracy over the life of the injector. In order to maintain this level of performance for a CNG injector, certain strategies and sequences of operation are required to optimize the combustion of the fuel.

The CNG (Compressed Natural Gas) injector is required to open and close very quickly to promote efficient fuel consumption. In order to accomplish this objective effectively the magnetic circuit utilized to open the valve needle must produce a magnetic field—or flux—relatively quickly across the working gap between the fuel inlet connector and the armature. The CNG injector has a magnetic circuit consisting of an inlet connector, armature, valve body shell, housing and a coil. When energized, the coil produces a magnetic field which is conducted through the magnetic circuit. The flux is conducted through the components and creates an attractive force at the working gap, which force causes upward movement of the armature, with consequent upward movement of the valve needle to open the injector valve.

The CNG injector is required to open and close very quickly. This quick opening creates a relatively severe impact between the armature and the inlet connector. In the CNG injector, the factors which effect impact velocity between the armature and inlet connector are more severe then in a gasoline injector. Compared to a gasoline injector, the CNG injector has two to three times the lift, less spring preload and similar force required to open the injector. The difference is then exaggerated by the lower viscosity (CNG) fluid then gasoline.

A CNG injector requires a much higher flow rate and area to obtain the same amount of energy flow through the injector in a given pulse. This is caused by the lower density of the gaseous CNG when compared to standard gasoline. This requires that the lift for a CNG injector be much greater than it is for a gasoline injector.

The increased lift creates two problems. First, the increased lift substantially reduces the magnetic force available to open the injector. Second, the velocities created because of the longer flight times can be higher, creating higher impact momentum. The reduction in magnetic force also creates another problem. This reduction in force requires the use of a lighter spring preload than in a standard gasoline injector.

A standard gasoline injector usually utilizes about 4 Newton's of spring preload and a very small gasoline force on the needle armature assembly while the injector is closed. In a CNG injector, the force of the gas pressure is about 3 Newton's and the force of the spring is about 2 Newton's. When the CNG injector is energized, the needle armature will begin to move when the magnetic force reaches a level which can overcome the spring and the gas force. The gasoline injector will operate in the same way. However, in a CNG injector, the gas force is removed as soon as the needle/seat seal is broken and the pressure equalizes at the tip of the needle. At this point the magnetic force is substantially higher then it needs to be to lift the armature needle assembly against the force of the spring. This excess magnetic force, combined with a relatively light spring preload, high lift and low viscosity fluid all contribute to high impact velocities between the armature and the inlet connector. We have invented a Compressed Natural Gas Injector which provides gaseous damping for the armature/needle assembly during opening of the gaseous fuel valve.

SUMMARY OF THE INVENTION

An electromagnetically operable fuel injector for a gaseous fuel injection system of an internal combustion engine, the injector having a generally longitudinal axis, which comprises, a ferromagnetic core, a magnetic coil at least partially surrounding the ferromagnetic core, an armature magnetically coupled to the magnetic coil and being movably responsive to the magnetic coil, the armature actuating a valve closing element which interacts with a fixed valve seat of a fuel valve and being movable away from the fixed valve seat when the magnetic coil is excited. The armature has a generally elongated shape and a generally central opening for axial reception and passage of gaseous fuel from a fuel inlet connector positioned adjacent thereto. The fuel inlet connector and the armature are adapted to permit a first flow path of gaseous fuel through a working gap between the fuel inlet connector and said armature and between the armature and the magnetic coil as part of a path leading to the fuel valve. At least one first fuel flow aperture extends through a wall portion of the armature to define a second flow path of gaseous fuel as part of a path leading to the fuel valve, the at least one fuel flow aperture being dimensioned to provide predetermined fuel flows past said armature and through said armature. Preferably the armature defines at least one second aperture in a wall portion thereof to define a third flow path of gaseous fuel as part of a path leading to the fuel valve. The at least one second aperture is dimensioned and oriented with respect to the longitudinal axis to provide predetermined volumetric flow rates around the armature and through the armature such that the combined flow area across the working gap and through the working gap between the armature and the magnetic coil exceeds the area available for fuel flow through the armature. Preferably the at least one second aperture is oriented at a generally acute angle with respect to the longitudinal axis.

The fuel inlet connector and the armature are spaced to define a working gap therebetween and are adapted to permit the first flow path of gaseous fuel within the working gap. The fuel injector further comprises a valve body positioned downstream of the armature and having at least one aperture in a wall portion thereof for reception of fuel from at least two of the flow paths of gaseous fuel from the armature and the fuel inlet connector.

The fuel injector further comprises a valve body shell at least partially surrounding the armature and the valve body, the valve body shell defining a radial space with the armature for passage of the first flow path of gaseous fuel between the armature and the magnetic coil and valve body shell. The fuel inlet connector is positioned above the armature and is spaced from the armature by a working gap, the fuel inlet connector defining a through passage for directing fuel toward the armature and the fixed valve seat. The fuel inlet connector comprises an upper end portion adapted for reception of gaseous fuel from a fuel source, and a lower end portion for discharging gaseous fuel, the lower end portion having a lower surface which faces an upper surface of the armature, the lower surface of the fuel inlet connector having a plurality of radially extending raised pads defined thereon, the pads having recessed portions therebetween to permit fuel to flow therethrough and across the working gap defined between said fuel inlet connector and said armature. The at least one first and second apertures in the armature are from about 1 to about 2.0 mm in diameter.

The armature further defines at least a second fuel flow aperture extending through a lower portion thereof and oriented at an acute angle with said longitudinal axis, and positioned for directing fuel therethrough toward the fixed valve seat, the at least one second aperture having a diameter from about 1.0 mm to about 2.0 mm. The lowermost surface of the fuel inlet connector and the armature are adapted to permit gaseous fuel to flow across said working gap and between said armature and said magnetic coil whereby at least three fuel flow paths are permitted. Further, a fuel filter is positioned at an upper end portion of the fuel inlet connector for filtering fuel prior to reception by the fuel inlet connector.

The fuel inlet connector includes a lower surface portion having a plurality of radially extending grooves defining a corresponding plurality of radially extending raised pads so as to reduce the effective surface area of the lower surface portion of the fuel inlet connector facing the armature to thereby permit the gaseous fuel to flow generally transversely in the working gap, the transverse fuel flow thereby preventing accumulation of contaminants in the working gap. The generally radially extending pads preferably have a generally trapezoidal shape and are about 0.05 mm in height.

A method is disclosed for directing gaseous fuel through air electromagnetically operable fuel injector for a fuel system of an internal combustion engine, said injector having a generally longitudinal axis, and including a fuel inlet end portion and a fuel outlet end portion, a fuel inlet connector positioned at the fuel inlet end portion and having a fuel inlet end portion and a fuel outlet end portion, an armature positioned adjacent the fuel outlet end portion of the fuel inlet connector and having a generally central elongated opening for reception of fuel from the fuel inlet connector. The armature is spaced from the fuel inlet connector to define a working gap to permit movement of the armature toward and away from the fuel inlet connector to selectively open and close a fuel valve to permit gaseous fuel to pass therethrough to an air intake manifold. The method comprises directing the gaseous fuel to pass axially through said fuel inlet connector, directing the gaseous fuel to pass from the fuel inlet connector to the generally elongated central opening of the armature in an axial direction toward the fuel valve, directing at least a portion of the fuel flow from the fuel inlet connector to the armature to flow generally transversely across the working gap, and diverting at least a portion of the flow of gaseous fuel passing through the armature to flow through at least one aperture in a wall portion of the armature, the aperture being dimensioned between about 1.0 mm and about 2.0 mm and being oriented in a direction away from the axial direction. According to the method, the aperture in the wall portion of the armature extends generally transverse to the axial direction and the combined flow area across the working gap and through the working gap and between the radial space between the armature and the valve body shell exceeds the area available for fuel flow through the armature. The lower end portion of the fuel inlet connector faces an upper end portion of the armature and is configured to permit the gaseous fuel to flow from the fuel inlet connector to be directed transversely across the working gap. The gaseous fuel flowing in the armature is permitted to pass through at least one second aperture in a lower wall portion thereof, the at least one second aperture extending at an acute angle to the longitudinal axis, and being dimensioned between about 1.0 mm and about 2.0 mm in diameter, whereby at least three separate fuel flow paths are established. According to the method, the fuel inlet connector includes a plurality of adjacent raised pads on a lowermost end portion thereof, the raised pads being respectively spaced by adjacent recessed portions and being about 0.05 mm in height to permit the flow of gaseous fuel through the working gap when the armature moves toward the fuel inlet connector to thereby open the fuel valve. Predetermined numbers of the first and second apertures are provided and the diameters thereof are predetermined to establish a predetermined number of fuel flow paths and volumetric flow rates thereof.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figure 1:
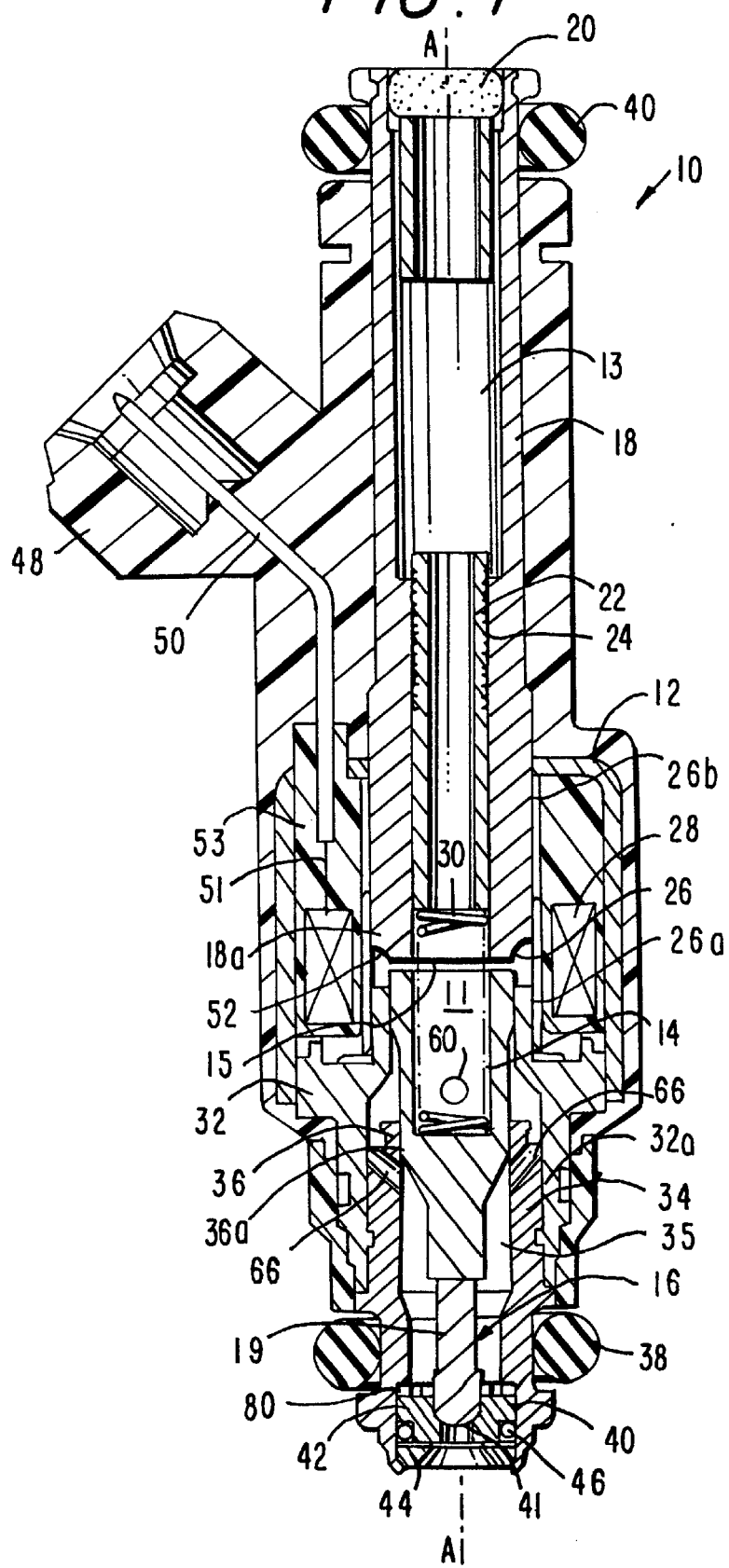
FIG. 1 is a view partially in cross-section, of a preferred embodiment of a compressed natural gas injector constructed according to the invention.

Referring initially to FIG. 1 there is shown a CNG injector 10 which is constructed according to the present invention. Injectors of the type contemplated herein are described in commonly assigned U.S. Pat. No. 5,494,224, the disclosure of which is incorporated by reference herein. Significant features of the present invention are also disclosed in commonly assigned, commonly filed (Attorney Docket No. 98P7677US01) copending application entitled "Contaminant Tolerant Compressed Natural Gas Injector and Method of Directing Gaseous Fuel Therethrough, the disclosure of which is incorporated herein by reference.

The injector 10 includes housing 12 containing armature 14 to which valve needle 16 is attached by crimping in a known manner. Fuel inlet connector 18 includes central fuel flow opening 13 and CNG filter 20 at the upper end portion of opening 19 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and inlet connector 18 define with housing 12, an enclosure for coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown).

Figure 2:
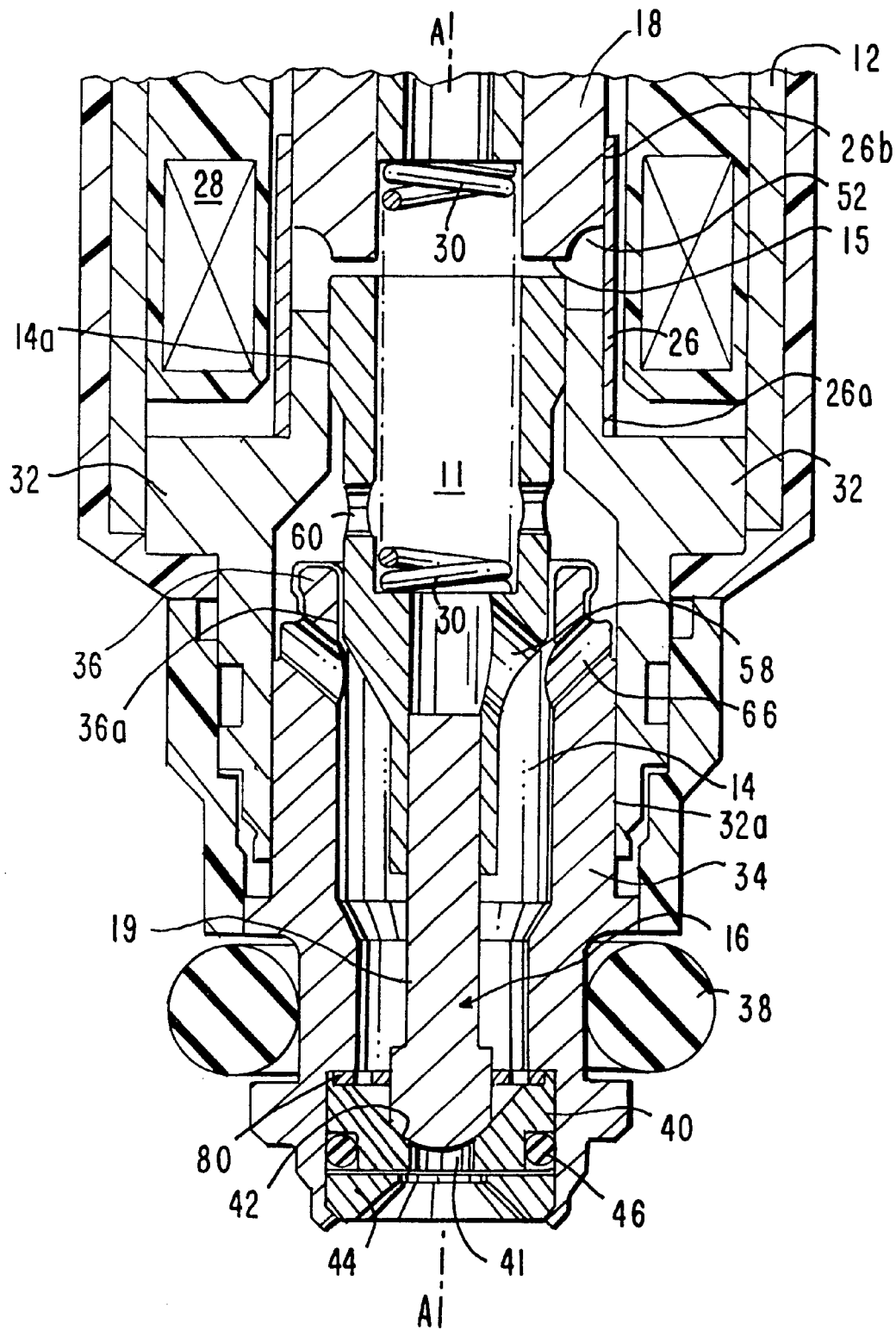
FIG. 2 is an enlarged cross-sectional view of the lower portion of the injector of FIG. 1, showing the improved fuel inlet connector and armature configuration which forms part of the invention.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 40 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector at 26b. Thus, fuel flowing from fuel inlet connector 18 across working gap 15 must flow through the clearance space 14a between armature 14 and valve body shell 32 which is also provided to permit upward and downward movement of armature 14. The space 14a is approximately 0.10 to about 0.30 mm on the diameter.

Referring again to FIGS. 1 and 2, valve seat 40 contains a valve orifice 41 and a funnel shaped needle rest 42 having a frusto-conical cross-sectional shape. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Coil 28 is surrounded by dielectric plastic material 53 as shown in the FIGS.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Lower O-rings 38 provide sealing between the injector 10 and the engine intake manifold (not shown) and upper O-rings 40 provide sealing between the injector 10 and the fuel rail.

Referring again to FIGS. 1 and 2, valve seat 40 contains a valve orifice 41 and a funnel shaped needle rest 42. The valve seat 40 is maintained in position by back-up washer 44 and sealed against fuel leakage with valve body 34 by O-ring 46. Overmold 48 supports terminal 50 which extends into coil 28 and is connected via connection 51 (shown schematically) to provide selective energization of the coil to open the valve by raising the armature 14 and valve needle 16 against the force of spring 30. Coil 28 is surrounded by dielectric plastic material 53 as shown in the FIGS.

Figure 4:
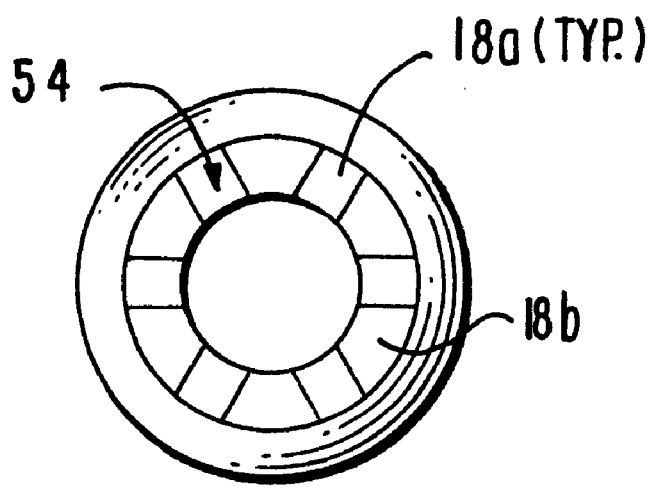
FIG. 4 is a plan view of the bottom surface of the preferred fuel inlet connector shown in FIG. 1.

As shown in FIG. 4, radial slots in the form of recessed surfaces 18a are provided in the lowermost surface of inlet connector 18 to reduce the effective contact surface area between the armature and the inlet connector by about one third of the total cross-sectional area which was utilized in prior art conventional injectors. This configuration provides six coined pads 18b of about 0.05 mm in height, thus creating six corresponding rectangular shaped radial slots 18a to provide fuel flow paths. By reducing, the effective surface area of the lowermost face of the inlet connector 18 as shown, the tendency to develop an attractive force between the inlet connector 18 and the armature 14 is significantly reduced to about one-third of its original value, and the ability to tolerate fuel contaminants at the interface without producing an attractive force therebetween is also significantly increased. As noted, preferably, the rectangular radial slots 18a are of a shallow depth, i.e. about 0.05 mm, (i.e., millimeters) in order to provide the benefit of reducing the inlet connector/armature interface surface area while still providing a relatively unobtrusive location for collection of solid contaminants which are ultimately removed by the flow of gaseous CNG.

As noted, the provision of recessed surfaces 14a in the lowermost surface of inlet connector 18 creates raised pads 18b on the surface, which pads improve the tolerance of the injector to fuel contaminants in several ways. The recessed surfaces 18a may be made by any suitable process, but are preferably coined. The first effect is to reduce the contact area of the inlet connector at the armature interface, thereby significantly reducing any attractive force generated therebetween by liquid contaminants such as oil or water. Furthermore, as noted, the radial pads 18b provide hidden areas between the pads where contaminants can collect without affecting the operative working gap 15 until being drawn away by the fuel flow. The working gap for gasoline is about 0.08 mm to about 0.14 mm and about 0.3 mm for compressed natural gas. In addition, as noted, the provision of the six rectangular recessed portions in the form of slots 18a and six raised pads 18b, each having a generally trapezoidal shape, on the inlet connector, provide a unique fuel flow path past the inlet connector/armature interface in a manner which causes the gaseous fuel to pass transversely through the working gap 15 as shown at 56 in FIG. 5 and allow for the control of the fuel flow around and through the armature by controlling the pressure losses.

Also, by controlling the sizes of the recessed surfaces 18a and raised pads 18b, and the various apertures 58, 60, 66 in the armature and the valve body as will be described—as well as the numbers and combinations of such openings—the fuel flow can be controlled over at least three flow paths and pressure losses can also be controlled. For example, a small pressure differential across the armature while fully open, assists spring 30 during breakaway upon closing and provides dampening on opening impact. The additional fuel flow path also reduces the possibility of contaminants collecting above upper guide 36 as shown in FIG. 2. In summary, numerous combinations of apertures and sizes thereof—as well as slots and pads on the fuel inlet connector—can be made to direct the gaseous fuel flow in any desired manner which is best for optimum fuel burning and engine application.

Figure 3:
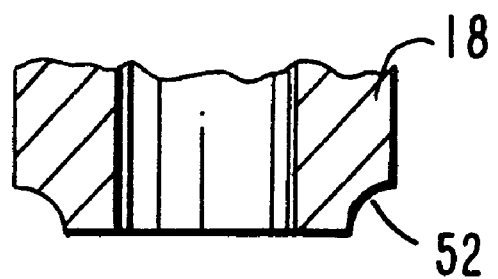
FIG. 3 is a partial elevational cross-sectional view of the lower end portion of the fuel inlet connector of the injector shown in FIG. 1.
Figure 5:
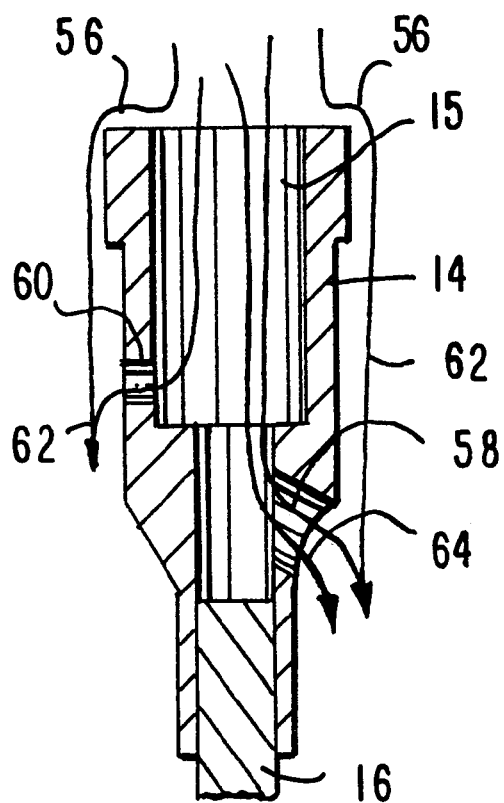
FIG. 5 is an elevational cross-sectional view of a preferred embodiment of the armature shown in FIG. 1 and illustrating the improved fuel flow paths resulting therefrom.
Figure 6:
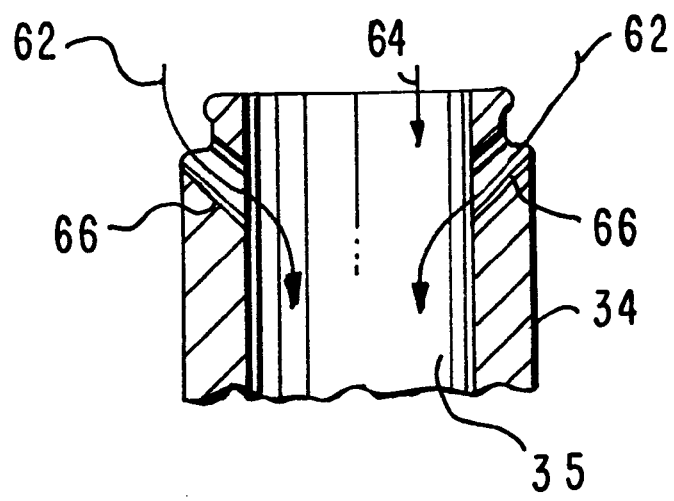
FIG. 6 is an elevational cross-sectional view of the upper portion of a preferred embodiment of the valve body shown in FIG. 1.

Referring now to FIGS. 5 and 6 in conjunction with FIGS. 1–3, there is illustrated still another significant improvement which renders the fuel injector assembly more fully capable of operation with CNG. In prior art injectors the fuel would pass through the filter down through the inlet connector into the armature and out an opening positioned relatively close to the lowest portion of the armature which was located substantially immediately above the valve aperture. In the present structure there is provided a relatively diagonally oriented aperture 58 shown in FIG. 5, which directs the CNG flow therethrough and downwardly toward valve aperture 41 for entry into the intake manifold of the internal combustion engine.

As shown in FIG. 5, aperture 58 forms a generally acute angle with longitudinal axis A—A of the fuel injector 10. In addition, the armature of the present invention provides at least one side opening 60 which is generally transverse to the longitudinal axis A—A, to permit fuel flowing downwardly through the center of the armature to be directed sidewardly out of the armature and thereafter downwardly toward the valve aperture 41 shown in FIG. 1. In the embodiment shown in FIG. 1, aperture 60 is generally horizontal, but may be oriented at an acute angle to the longitudinal axis if desired. Aperture 58 is not shown in the cross-sectional view of FIG. 1. The fuel flowing through aperture 60 is indicated by the flow lines 62 and the fuel flowing through aperture 58 is indicated schematically by flow lines 64. Optionally several additional horizontal apertures 60 may be provided in the armature at different radial locations thereabout, or alternatively as shown, one aperture 60 may be provided, depending upon the fuel flow pattern sought in each particular instance. It can be seen that the fuel flow from the fuel inlet connector 18 is divided into three paths, a first path expanding across working gap 15, a second path through aperture(s) 60, and a third path through aperture(s) 58. The first path extends between the armature 14 and the magnetic coil 28 and is ultimately joined by the second flow path passing through aperture(s) 60.

It can also be readily appreciated that the diameters of each aperture 58, 60 can be varied to direct the fuel flow in any predetermined desired direction. For example, by reducing the size of apertures 58,60 fuel will be encouraged to flow with increased volume cross the working gap 15. Alternatively, increasing the diameter of apertures 58, 60 will attract greater volume of fuel through those apertures and thereby reduce the fuel flow across the working gap. It has also been found that the diameters of the apertures 58, 60 and the numbers and locations of such apertures affect the damping characteristics of the valve needle 16, both upon opening and upon closing. Accordingly, the diameter of fuel flow apertures 58, 60 and the numbers, locations, and orientations of such apertures will depend upon the desired volumetric flow characteristics and desired flow patterns in each instance; however diameters within the range of 1–2 mm have been found to be preferable.

Referring now to FIG. 6, a valve body 34 is also provided with central fuel flow opening 35 and several diagonally oriented fuel path apertures 66 which are intended to receive the CNG fuel flowing from the first and second flow paths from the working gap 15 and aperture(s) 60 along the sides of the armature 14 and to redirect the fuel downwardly toward the valve aperture 41 such that when the needle 16 is lifted, the fuel is permitted to enter aperture 41 and thereafter directed into the intake manifold of the engine, neither of which are shown in the drawings. Fuel flowing along the third flow path through aperture(s) 58 lead directly toward aperture 41. It has been found that the unique provisions of the apertures 58 and 60—as well as rectangular radial slots 18a on the inlet connector lowermost face—create a fuel flow pattern which induces the CNG to flow in the manner shown by the fuel flow lines at 56, 62 and 64 in FIG. 5 and such fuel flow lines actually create ideal pressure conditions to avoid causing the armature to be attracted to the inlet connector. Thus the attractive forces between the armature and inlet connector are minimized by the several factors mentioned, namely the elimination of the tendency of the oil and contaminates to accumulate in the space 15 located between the armature and the inlet connector, the reduction of the effective inlet connector/armature interface area by provision of radial pads on the face of the inlet connector, and the provision of the unique CNG flow pattern which creates a force free environment between the inlet connector and the armature.

As indicated, alternatively, apertures 60 may be provided in several locations about the circumference of the armature, and apertures 58 may be provided in several locations thereabout. Also their angular orientations may be varied. However, it has been found that a single aperture on each side, as shown is sufficient to produce the desired flow path and the force free environment. Also, as noted, it should be noted that the diameter of each aperture can be altered in order to provide control of the fuel pressures and flow patterns in the areas surrounding the inlet connector, the armature, and the valve body, so as to provide a predetermined fuel flow pattern throughout the injector as may be desired.

It should also be noted that the presence of the diagonally oriented fuel flow apertures 66 in valve body 34 eliminates the problems of prior art injectors wherein debris and contaminants would accumulate in the area of the upper valve guide 36, causing abrasive action and intermittent guidance between the upper guide 36 and the armature 14. Thus, the provision of the diagonally oriented apertures 66 in valve body 34 encourage the flow of CNG past the area surrounding the upper guide 36 and eliminate any accumulation tendencies for contaminants in the area of upper guide 36.

The operation of the present invention will now be described. The stages that a CNG injector goes through while initiating opening begin with energizing the coil and building of magnetic flux (force) across the working gap. Next, this force builds to a level greater than the combined spring and gas forces acting on the armature needle assembly, opening the injector. After the armature begins moving toward the inlet connector, the gas force is removed, the magnetic force increases rapidly, and the spring is compressed to store energy which will close the injector when the coil is deenergized.

The last stage of opening presents a difficult damping problem. The spring 30 only removes (i.e., stores) energy linearly as the working gap 15 is decreased. The magnetic circuit adds energy to the armature assembly roughly as the square of the working gap. This fact alone already accounts for a difficult problem. When the gas force is also considered to have been removed after beginning to open, the armature assembly 14 undergoes a significant acceleration. This acceleration creates high velocity and high impact forces. To solve this problem the present invention provides damping of the components.

Figure 9:
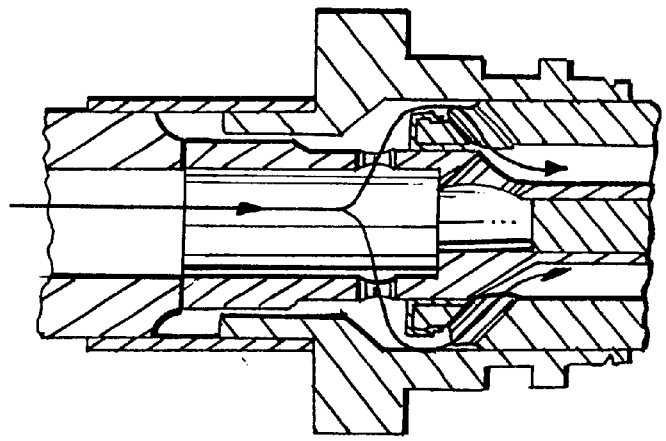
FIG. 9 is a schematic elevational view of the fuel inlet connector/armature assembly of FIG. 1 in a "fully open" condition wherein fuel flow through the armature exceeds the fuel flow around the armature.
Figure 8:
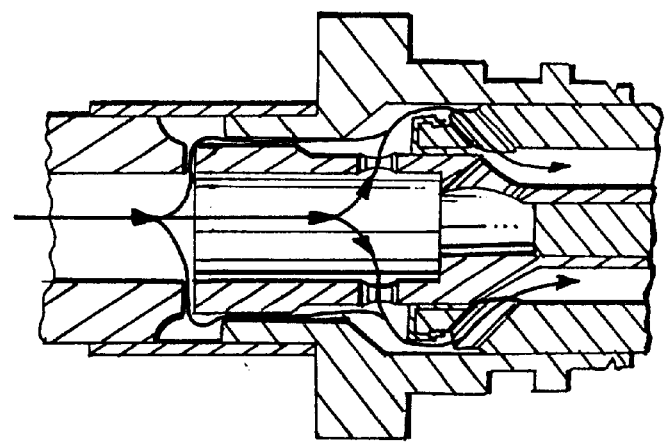
FIG. 8 is a schematic elevational view of the fuel inlet connector/armature assembly illustrating the armature in a "midway" open condition wherein fuel flow around the armature exceeds the fuel flow through the armature.
Figure 7:
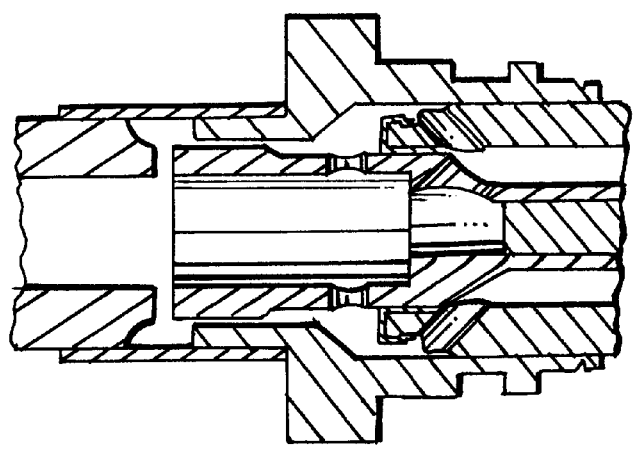
FIG. 7 is a schematic elevational view of the fuel inlet connector/armature assembly of FIG. 1 illustrating the armature in a "closed valve", no fuel flow condition.

As described hereinabove, according to the invention, multiple paths are provided by which fuel flows through the armature and past the working gap. The sequence of flow is shown in the stages of opening shown in FIGS. 7–9. In particular, the present invention intentionally allows more total flow past the armature (around and through) while it is in motion than while it is fully open. When the armature nears the inlet connector, the armature is attempting to restrict already established flow across the working gap, thus forcing the fuel to pass through the armature. This restriction thus creates the damping. By controlling the available flow area below the working gap and through the armature, the amount of damping can be adjusted. Such control is achieved by controlling the dimensions and numbers of apertures 58, 60, as well as by controlling the dimensions and numbers of recessed slots 1 8b and pads 1 8a on inlet connector 18.

In the present instance, the CNG injector has three flow paths. One path is across the working gap and around the armature. The second path is through aperture(s) 60 to meet the first path. The third path is through the armature and aperture(s) 58. Ultimately all paths are directed to fuel valve aperture 41 and to the intake manifold of the engine. While in motion, the combined flow area across the working gap and through the gap between the armature and the magnetic coil and valve body shellexceeds the area available for fuel flow through the armature. As the armature nears the inlet connector, the flow area across the working gap is restricted to the point that a pressure differential is created. This pressure differential, higher pressure inside the armature and lower pressure outside, removes energy from the incoming armature and reduces it's impact velocity.

Although the invention has been described in detail with reference to the illustrated preferred embodiments, variations and modifications may be provided within the scope and spirit of the invention as described and as defined by the following claims.

What is claimed is:

1. An electromagnetically operable fuel injector for a gaseous fuel injection system of an internal combustion engine, said injector having a generally longitudinal axis, which comprises:
   a) a ferromagnetic core;
   b) a magnetic coil at least partially surrounding the ferromagnetic core;
   c) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said armature having a generally elongated shape and a generally central opening for axial reception and passage of gaseous fuel from a fuel inlet connector positioned adjacent thereto, said fuel inlet connector and said armature being adapted to permit a first flow path of gaseous fuel through a working gap between said fuel inlet connector and said armature and between said armature and said magnetic coil as part of a path leading to said fuel valve; and
   d) at least one first fuel flow aperture extending through a wall portion of said armature to define a second flow path of gaseous fuel as part of a path leading to said fuel valve, said at least one fuel flow aperture being dimensioned to provide predetermined fuel flows past said armature and through said armature.

2. The electromagnetically operable fuel injector according to claim 1, wherein said armature defines at least one second aperture in a wall portion thereof to define a third flow path of gaseous fuel as part of a path leading to said fuel valve, said at least one second aperture being dimensioned and oriented with respect to the longitudinal axis to provide predetermined volumetric flow rates around said armature and through said armature such that the combined flow area across said working gap and through said working gap between said armature and said magnetic coil exceeds the area available for fuel flow through said armature.

3. The electromagnetically operable fuel injector according to claim 2, wherein said at least one second aperture is oriented at a generally acute angle with respect to the longitudinal axis.

4. The electromagnetically operable fuel injector according to claim 3, wherein said fuel inlet connector and said armature are spaced to define a working gap therebetween and are adapted to permit said first flow path of gaseous fuel within said working gap.

5. The electromagnetically operable fuel injector according to claim 3, further comprising a valve body positioned downstream of said armature and having at least one aperture in a wall portion thereof for reception of fuel from at least two of said flow paths of gaseous fuel from said armature and said fuel inlet connector.

6. The electromagnetically operable fuel injector according to claim 5, further comprising a valve body shell at least partially surrounding said armature and said valve body, said valve body shell defining a radial space with said armature for passage of said first flow path of gaseous fuel between said armature and said magnetic coil and valve body shell.

7. The electromagnetically operable fuel injector according to claim 6, wherein said fuel inlet connector is positioned above said armature and is spaced from said armature by a working gap, said fuel inlet connector defining a through passage for directing fuel toward said armature and said fixed valve seat.

8. The electromagnetically operable fuel injector according to claim 7, wherein said fuel inlet connector comprises an upper end portion adapted for reception of gaseous fuel from a fuel source, and a lower end portion for discharging gaseous fuel, said lower end portion having a lower surface which faces an upper surface of said armature, said lower surface of said fuel inlet connector having a plurality of radially extending raised pads defined thereon, said pads having recessed portions therebetween to permit fuel to flow therethrough and across said working gap defined between said fuel inlet connector and said armature.

9. The electromagnetically operable fuel injector according to claim 8, wherein said at least one first and second apertures in said armature are from about 1 to about 2.0 mm in diameter.

10. An electromagnetically operable fuel injector for a compressed natural gas fuel injection system of an internal combustion engine, said injector having a generally longitudinal axis, which comprises:
    a) a ferromagnetic core;
    b) a magnetic coil at least partially surrounding said ferromagnetic core;
    c) an armature coupled to said magnetic coil and movably responsive to said magnetic coil, said armature having a first upper end face and a lower end portion;
    d) a valve body shell at least partially surrounding said armature between said armature and said magnetic coil and providing a radial space therebetween for passage of gaseous fuel;
    e) a valve closing element connected to said lower end portion of said armature and interactive with a fixed valve seat to selectively permit fuel to pass through said valve seat as said valve closing element is moved to a valve open position by said armature;

f) a fuel inlet connector extending in a generally longitudinal direction above said armature and defining a path for fuel to enter said inlet connector and to be directed toward said armature, said fuel inlet connector having a lowermost end portion having a lowermost surface spaced above said armature to define a working gap through which said armature is movable; and g) said armature having a fuel reception portion for receiving fuel directed from said fuel inlet connector, said armature further defining a generally axial fuel passage and at least a first fuel flow aperture extending through a wall portion thereof for directing fuel from said fuel inlet connector through said generally axial fuel passage and into said aperture toward said fixed valve seat for entry into an air intake manifold for the engine, said fuel flow aperture being oriented generally transverse to said longitudinal axis and having a diameter from about 1.0 mm to about 2.0 mm whereby the combined flow area across said working gap and through said working gap and said radial space between said armature and said valve body shell exceeds the area available for fuel flow through said armature.

11. The electromagnetically operable fuel injector according to claim 10, wherein said armature further defines at least a second fuel flow aperture extending through a lower portion thereof and oriented at an acute angle with said longitudinal axis, and positioned for directing fuel therethrough toward said fixed valve seat, said at least one second aperture having a diameter from about 1.0 mm to about 2.0 mm.

12. The electromagnetically operable fuel injector according to claim 11, wherein said lowermost surface of said fuel inlet connector and said armature are adapted to permit gaseous fuel to flow across said working gap and between said armature and said magnetic coil whereby at least three fuel flow paths are permitted.

13. The electromagnetically operable fuel injector according to claim 12, wherein a fuel filter is positioned at an upper end portion of said fuel inlet connector for filtering fuel prior to reception by said fuel inlet connector.

14. The electromagnetically operable valve according to claim 13, wherein said fuel inlet connector includes a lower surface portion having a plurality of radially extending grooves defining a corresponding plurality of radially extending raised pads so as to reduce the effective surface area of said lower surface portion of said fuel inlet connector facing said armature to thereby permit the gaseous fuel to flow generally transversely in said working gap, said transverse fuel flow thereby preventing accumulation of contaminants in said working gap.

15. The electromagnetically operable fuel injector according to claim 14, wherein said generally radially extending pads have a generally trapezoidal shape and are about 0.05 mm in height.

16. A method of directing gaseous fuel through air electromagnetically operable fuel injector for a fuel system of an internal combustion engine, said injector having a generally longitudinal axis, and including a fuel inlet end portion and a fuel outlet end portion, a fuel inlet connector positioned at said fuel inlet end portion and having a fuel inlet end portion and a fuel outlet end portion, an armature positioned adjacent said fuel outlet end portion of said fuel inlet connector and having a generally central elongated opening for reception of fuel from said fuel inlet connector, said armature being spaced from said fuel inlet connector to define a working gap to permit movement of said armature toward and away from said fuel inlet connector to selectively open and close a fuel valve to permit gaseous fuel to pass therethrough to an air intake manifold, comprising:

a) directing the gaseous fuel to pass axially through said fuel inlet connector;

b) directing the gaseous fuel to pass from said fuel inlet connector to said generally elongated central opening of said armature in an axial direction toward said fuel valve;

c) directing at least a portion of the fuel flow from said fuel inlet connector to said armature to flow generally transversely across said working gap; and d) diverting at least a portion of the flow of gaseous fuel passing through said armature to flow through at least one aperture in a wall portion of said armature, said aperture being dimensioned between about 1.0 mm and about 2.0 mm and being oriented in a direction away from said axial direction.

17. The method according to claim 16, wherein said aperture in said wall portion of said armature extends generally transverse to said axial direction and the combined flow area across said working gap and through said working gap and between said radial space between said armature and said valve body shell exceeds the area available for fuel flow through said armature.

18. The method according to claim 17, wherein a lower end portion of said fuel inlet connector facing an upper end portion of said armature is configured to permit said gaseous fuel to flow from said fuel inlet connector to be directed transversely across said working gap.

19. The method according to claim 18, wherein at least a portion of the gaseous fuel flowing in said armature is permitted to pass through at least one second aperture in a lower wall portion thereof, said at least one second aperture extending at an acute angle to said longitudinal axis, and being dimensioned between about 1.0 mm and about 2.0 mm in diameter, whereby at least three separate fuel flow paths are established.

20. The method according to claim 19, wherein said fuel inlet connector includes a plurality of adjacent raised pads on a lowermost end portion thereof, said raised pads being respectively spaced by adjacent recessed portions and being about 0.05 mm in height to permit the flow of gaseous fuel through said working gap when said armature moves toward said fuel inlet connector to thereby open said fuel valve.

21. The method according to claim 20, wherein predetermined numbers of said first and second apertures are provided and the diameters thereof are predetermined to establish a predetermined number of fuel flow paths and volumetric flow rates thereof.

* * * * *